2,924,545

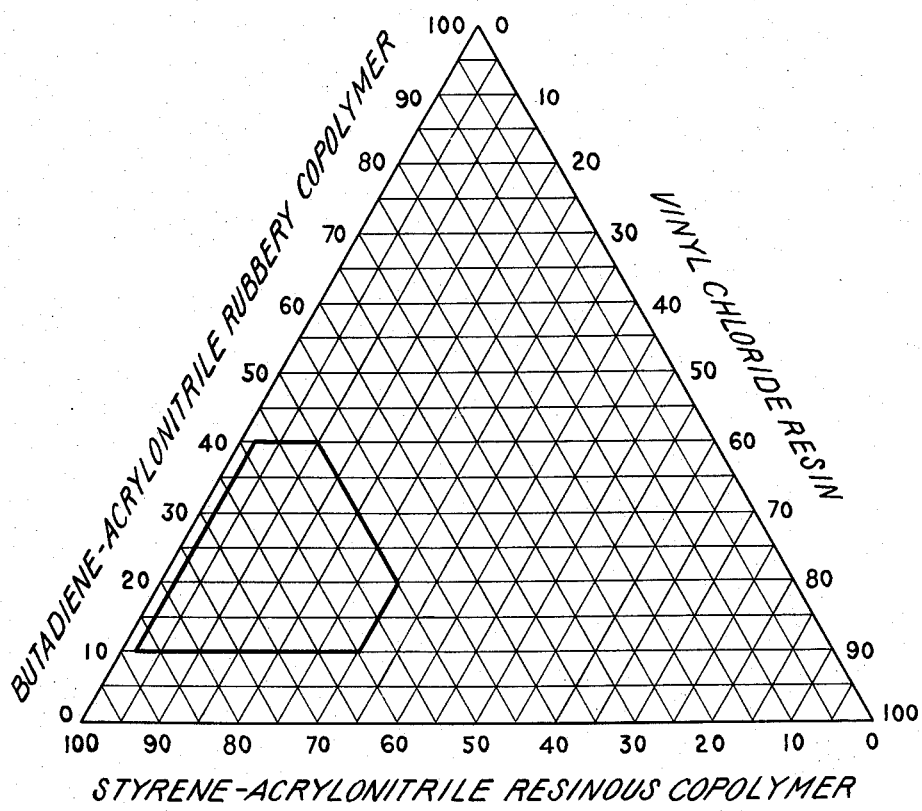

2,924,545

THERMOPLASTIC MIXTURE OF BUTADIENE-ACRYLONITRILE RUBBER, STYRENE-ACRYLONITRILE RESIN AND VINYL CHLORIDE RESIN

Lawrence E. Daly, Mishawaka, Ind., assignor to United States Rubber Company, New York, N.Y., a corporation of New Jersey Application June 22, 1955, Serial No. 517,197

6 Claims. (Cl. 154—43)

This invention relates to hard, tough, thermoplastic compositions of matter. More particularly, the invention relates to an improvement in hard, tough, thermoplastic mixtures of butadiene-acrylonitrile rubbery copolymers and resinous copolymers of a styrene and acrylonitrile, such as are described in by U.S. Patent 2,439,202 and in U.S. Patent to Romeyn et al. 2,600,024.

Hard, tough, thermoplastic blends of rubbery copolymers of butadiene and acrylonitrile and resinous copolymers of a styrene selected from the group consisting of styrene, alpha-methyl styrene, para-methyl styrene, alpha-methyl para-methyl styrene, or a nuclearly chlorinated styrene have achieved great commercial importance. However, their resistance to flex fatigue cracking has not been desirably high in certain applications, such as automotive applications, wherein the parts made from such blends have been subjected to repeated flexing in serivce. Resistance to flex fatigue is also important in installations of plastic pipe made from such blends in industrial plants where the vibrations set up by machines cause the pipe to vibrate and flex under normal service conditions.

The resistance of parts made from such blends to flex fatigue cracking is further reduced by embossing a surface of a sheet-like continuous form of the blend, for example, to impart thereto a leather-like surface grain. In automotive applications in particular, it is highly desirable that the parts molded from the blends be so embossed on the surface exposed to view in order to have an enhanced appearance.

The inclusion of a substantial amount of color pigment in such blends further lowers the resistance thereof to flex fatigue cracking. The combination of both color pigments and embossed leather surface grain, which is an especially desirable combination, produces an especially low resistance to flex fatigue cracking.

The principal object of the present invention is to effect a commercially important increase in the resistance to flex fatigue cracking of blends of butadiene-acrylonitrile rubbery copolymers and styrene-acrylonitrile resins of the type mentioned above. Another object is to improve the flex fatigue cracking resistance of such blends which have a continuous sheet-like form, whether flat or drawn, and which have either a smooth surface or an embossed surface such as the aforemetioned leather-like grain. Another object is to greatly improve the resistance to flex fatigue cracking of such blends which contain a substantial proportion of color pigment, whether such pigmented blends are embossed or not. Another object is to effect an important increase in impact resistance at the same time that the resistance to flex fatigue cracking is improved. Numerous other objects will more fully hereinafter appear.

The accompanying drawing, which will be self-explanatory in the light of the following description, is a triangular phase diagram in which the compositions of my invention are indicated by the five-sided area at the lower left.

I have discovered that the resistance to flex fatigue cracking of hard, tough, thermoplastic mixtures of butadiene-acrylonitrile rubbery copolymers and styrene-acrylonitrile resinous copolymers of the type described in U.S. Patents 2,439,202 and 2,600,024, which are hereby expressly incorporated herein by reference, can be achieved by the inclusion of a selected proportion of a thermoplastic vinyl chloride resinous polymer in the mixture. For example, the inclusion of from 4 to 15% of polyvinyl chloride, based upon the sum of the rubbery copolymer, resinous copolymer and polyvinyl chloride, gives a product having more than twice the resistance to flex fatigue cracking possessed by a standard 30/70 blend of the rubbery copolymer and the resinous copolymer alone. At the same time a substantial improvement in notched impact resistance is achieved.

More particularly, my invention resides in the discovery that outstanding flex fatigue characteristics, coupled with substantially enhanced impact resistance, are obtained by blending in any suitable manner (A) a rubbery copolymer of butadiene and acrylonitrile, (B) a resinous copolymer of a major proportion of a styrene selected from the group consisting of styrene, alpha-methyl styrene, para-methyl styrene, alpha-methyl para-methyl styrene and nuclearly chlorinated styrenes, and a minor proportion of acrylonitrile, and (C) a vinyl chloride resinous polymer selected from the group consisting of polyvinyl chloride and copolymers of a major proportion of vinyl chloride with a minor proportion of another copolymerizable monomer, in relative proportions of from 10 to 40% of (A), from 50 to 88% of (B), and from 2 to 30% of (C), these percentages being by weight based on the sum of these three ingredients and totalling 100%, this mixture being formed into a uniform continuous article in any suitable manner, e.g. by compression or injection molding, by extrusion, or by calendering and sheeting in the manner described in U.S. Patent 2,439,202. The sheet can be embossed in any suitable manner or can be used without embossing. It can be drawn into three-dimensional articles by the well-known techniques.

Minor proportions of other ingredients, especially color pigments in amount preferably equal to at least 10 parts per 100 parts of the foregoing three ingredients, anti-oxidants for the rubbery component, stabilizers for the vinyl resin, etc. can be included in the mixture. Aside from minor proportions of pigments, anti-oxidants and stabilizers, by products usually consist essentially of the butadiene-acrylonitrile rubbery copolymer, the styrene-acrylonitrile resinous copolymer and the vinyl chloride resinous polymer in the aforementioned proportions. These three materials usually constitute the sole binding materials present.

An important feature of my mixtures is that they are substantially, and preferably completely, free from liquid plasticizers or softeners for the rubber or the resinous components of my blends. The use of such plasticizers would be objectionable because they would result in serious impairment in heat distortion temperature, in tensile strength, in hardness and in other physical properties.

The mixture of the rubbery copolymer, the styrene-acrylonitrile resinous copolymer and the vinyl chloride resin can be prepared in any suitable way, e.g. by blending latices or aqueous dispersions or slurries of these three components, co-precipitating the solids from the resulting blend, washing and drying. Or the mixture can be prepared by dry blending, as on an open rubber mill or in a Banbury mixer, of the separately prepared powdered ingredients. Alternatively, a latex blend of the rubbery copolymer and most or all of the styrene-acrylonitrile resin, formed by blending latices of these components, precipitating and drying, can be commingled with the vinyl chloride resin.

As will be obvious to those skilled in the art, so-called "latex blending" of the three principal materials of my blend can be effected by commingling water-based latices, suspensions or slurries of the three main components followed by coagulation or spray-drying of the resulting mixture. Since the rubbery copolymer is commonly made by emulsion polymerization, the resulting latex can be commingled with a latex of the styrene-acrylonitrile resinous copolymer which is often made by emulsion polymerization. A latex or aqueous suspension or slurry of the vinyl chloride resin can be commingled with the latices of the rubbery copolymer and the styrene-acrylonitrile resin.

Regardless of the form in which the three principal components of my mixture are employed, it is essential that they be consolidated into continuous form in any suitable way, this almost invariably being accomplished by mastication at a suitably elevated temperature to effect coalescence into a uniform homogeneous mixture followed by shaping which can be done by molding or extrusion or by sheeting out followed by plying up and drawing.

If desired, a small amount of monomeric styrene, say 1 to 5 parts based on 100 parts of Buna N rubber, styrene-acrylonitrile resin, and vinyl chloride resin, can be included in the mixture of powdered resins and rubber to act as a transient lubricant and processing aid. This gives the stock additional smoothness during processing and is volatized at the processing temperatures. Its use does not materially affect the physical properties of the final product.

Within the ranges given above, I especially prefer those compositions which contain from 2 to 20% of the vinyl chloride resin ingredient.

A new result achieved by my invention is that the blends made in accordance therewith have markedly greater resistance to flex fatigue failure than either a comparative blend of the rubbery and resinous copolymers alone or the vinyl chloride resin alone.

Any of the commercial forms of butadiene-acrylonitrile rubbery copolymers can be used in practicing my invention. With regard to this component, the disclosures of the aforementioned U.S. Patents 2,439,202 and 2,600,024 are applicable. The rubbery copolymer will usually have a combined acrylonitrile content of from 15 to 45% by weight. Although my invention is applicable with ungelled butadiene-acrylonitrile rubbery copolymer, I much prefer to employ copolymers which have had imparted thereto a methyl ethylketone-insoluble gel content of from 40 to 100% by weight, this gel being "tight" gel, i.e., having a swelling index of from 8 to 35 in methyl ethyl ketone and being incapable of conversion to a soluble state by milling. Such gel content is preferably imparted to the rubbery copolymer by cross-linking with divinylbenzene during emulsion polymerization, for example in the manner shown in U.S. Patent 2,597,951 to Romeyn et al. I prefer that the gelled copolymer have by itself and in the unvulcanized state a Mooney viscosity at 212° F. of from 40 to 80.

The high tight gel butadiene-acrylonitrile rubbery copolymer used in the examples given below was made by emulsion polymerization from the following recipe:

| | Parts |
|---|---|
| Butadiene | 65 |
| Acrylonitrile | 35 |
| Water | 180 |
| Emulsifying agent | 3 |
| Cumene hydroperoxide | 0.3 |
| Divinylbenzene | 1 |
| Mixed tertiary mercaptans | Variable |

This recipe was polymerized for 19 hours at 122° F. The divinylbenzene was added during polymerization in accordance with Romeyn et al. U.S. 2,597,951. After polymerization the emulsion was short-stopped with 0.2 part of dimethyl ammonium dimethyl dithiocarbamate and the polymer was recovered in the usual manner.

The styrene-acrylonitrile resinous copolymer component of my blends is also a well-known material. Again, reference is directed to the aforementioned Patents 2,439,202 and 2,600,024 for a full disclosure as to the preparation and nature of this material. Typically it will contain from 70 to 80% by weight of combined styrene (vinylbenzene) and correspondingly from 30 to 20% of acrylonitrile and will have an intrinsic viscosity of from 1 to 2. Instead of being made with styrene itself, it can be made with alpha-methyl styrene, para-methyl styrene, alpha-methyl para-methyl styrene, 2-chloro styrene, 4-chloro styrene or 2,4-dichloro styrene. Usually it will contain from 50 to 85% by weight of combined styrene or equivalent thereof and correspondingly from 50 to 15% by weight of acrylonitrile.

The styrene-acrylonitrile resinous copolymer used in the examples was made by emulsion polymerization from the following recipe:

| | Parts |
|---|---|
| Styrene | 70 |
| Acrylonitrile | 30 |
| Water | 180 |
| Potassium persulfate | 0.5 |
| Emulsifying agent | 2 |
| Mixed tertiary mercaptans | As required |

This recipe was polymerized at 140° F. for 4–6 hours after which the polymer was recovered in the usual way.

The vinyl chloride resinous polymer likewise is a well-known material. As already indicated, it may be either polyvinyl chloride or a resinous copolymer of a major proportion of vinyl chloride and a minor proportion of a copolymerizable monomer. Examples are copolymers of 85 to 96% of vinyl chloride and correspondingly 15 to 4% of vinyl acetate, vinylidene chloride, diethyl maleate, etc. The vinyl chloride polymer is thermoplastic and is typically made by emulsion or suspension polymerization.

Instead of using the vinyl chloride resin by itself, I can use it in the form of a mixture with a minor proportion of one or both of the other main components of my mixture. Such mixtures are commercially available. One example of such a mixture is a blend of vinyl chloride resin with a minor proportion of a styrene-acrylonitrile resinous copolymer as shown in U.S. Patent 2,646,417 to Jennings. Another example is a blend of the vinyl chloride resin with a minor proportion of a butadiene-acrylonitrile rubbery copolymer. When such blends are used as the source of the vinyl chloride resin, due allowance must of course be made for the content of other material therein in order to be certain that the relative proportions of three main components of my mixtures are within the ranges specified herein.

The following examples illustrate my invention in more detail.

The apparatus used in obtaining the flex fatigue resistance data given in the tables below was a single action machine testing one flat strip at a time by subjecting one face to intermittent tension and the other face to intermittent compression only. In all cases, the specimens were 1″ x 8″ x 70 gauge. The specimen undergoing test is rigidly clamped so as to project at right angles to the support and is bent from rest to a deflection of 2 inches at a point 2½ inches from the rigid support at the rate of 216 times per minute. This deflection is effected by pushing the specimen from the right angle position with a reciprocated member which is not clamped to the specimen. After each deflection the specimen is allowed to return as nearly as it will to the initial right angle position by following the reciprocating member in its return stroke. The apparatus as described serves very nicely to indicate the mode of failure as one face of each test sample is subjected to tensional distortion only and the opposite face to compressional distortion exclusively.

The samples invariably fail in tension at a point ⅛ inch out from the rigid mounting clamp, this being the point at which most of the bending of the samples takes place. I believe that the flex fatigue data obtained with this apparatus correlate closely with actual service test observations made on commercial applications of products made from the material of my invention, for example, automotive side seat trim panels. I also believe that the flex fatigue data reported in the tables correlates with data obtained in tests wherein the samples are subjected to reverse stresses.

"N" rubber (30 parts) and a resinous styrene-acrylonitrile copolymer (7 parts). Stock A was a control made by mixing the separately prepared powders on a rubber mill. Stock B was a similar mixture except that it was made by co-precipitation from a latex blend of a latex of the Buna N and a latex of the resinous copolymer. Stocks C to G were blends of 95; 90; 85; 75 and 50 parts of the material of stock A and 5; 10; 15; 25 and 50 parts, respectively, of the aforementioned "Geon 404HI." Stocks C to G were prepared by mill blending the separately prepared powdered components as in preparing stock A. Stock H consisted of 100 parts of "Geon 404HI." The data are given in Table I.

TABLE I

[All test specimens were 70 gauge and smooth surfaced]

| Stock | A (Blend) | B | C | D | E | F | G | H |
|---|---|---|---|---|---|---|---|---|
| High Tight Gel Buna N | 30 | 30 | 28.5 | 27 | 25.5 | 22.5 | 15 | -------- |
| Styrene-Acrylonitrile (70/30) Resinous Copolymer | 70 | 70 | 66.5 | 63 | 59.5 | 52.5 | 35 | -------- |
| "Geon 404HI" (92% Polyvinyl Chloride, 8% Styrene-Acrylonitrile Resin) | -------- | -------- | 5 | 10 | 15 | 25 | 50 | 100 |
| Number of Flex Cycles to Break | 16,200 | 29,160 | 28,080 | 50,976 | 133,920 | 137,600 | 38,880 | 2,160 |
| Notched Charpy Impact: | | | | | | | | |
| at R.T. | 12.5 | 8.5 | 15.2 | 16.1 | 20.0 | 18.0 | -------- | -------- |
| at 0° F. | 3.1 | 8.0 | 2.2 | 3.0 | 2.0 | 2.0 | -------- | -------- |
| Rockwell Hardness, R Scale | 78 | 68 | 76 | 78 | 78 | 80 | -------- | -------- |
| Tensile Strength, p.s.i. | 3,800 | 2,400 | 3,600 | 3,800 | 4,100 | 5,300 | -------- | -------- |
| Elongation, percent | 66 | 7 | 110 | 120 | 123 | 138 | -------- | -------- |
| Heat Distortion Temp., ° F., 264 p.s.i. | 170 | 160 | 170 | 165 | 159 | 156 | -------- | -------- |

In Experiments B, J and Q, a small amount of monomeric styrene was included in the original mixture of a transient processing aid. It has no appreciable effect on the physical properties of the product.

In the examples and throughout this specification and claims all proportions and percentages are by weight.

EXPERIMENTS A TO P

In these experiments, the source of the vinyl chloride resin was a commercial material made by the B. F. Goodrich Company and sold under the trade name "Geon 404HI," this being a commercially available blend of approximately 92% of polyvinyl chloride and 8% of a styrene-acrylonitrile resinous copolymer of the type mentioned above and of the type used in conjunction with the butadiene acrylonitrile rubbery copolymer in making the control stocks referred to hereinafter.

Various materials, as indicated in Table I, were milled together to homogeneity, calendered into thin sheets, and these sheets plied up under heat and pressure to form test specimens having a thickness of 70 gauge (0.070") and a smooth surface on each side. The resulting specimens were then tested with the results shown in Table I.

Stock A was a standard blend of a high tight gel Buna

The data in Table I illustrates the improvement obtained in flex fatigue resistance, notched impact resistance and the elongation values of stocks C, D, G and F which contained between 2 and 30% of polyvinyl chloride incorporated with the same ingredients as were used in control stock A.

Table II reports data obtained on stocks I, J, K, L and M, which were identical with stocks A, B, E, F and G of Table I, respectively, except that they were embossed with a leather grain during manufacture. For comparison, the flex fatigue values for the corresponding unembossed stocks are enumerated. The marked impairment resulting from embossing will be readily seen by comparing the flex fatigue figures. Stocks K and L, which embodied my invention, even when embossed, had very good resistance to flex fatigue.

TABLE II

[All test specimens for first line of data were 70 gauge embossed with a leather grain]

| | I | J | K | L | M |
|---|---|---|---|---|---|
| Stock | Same as Stock A above but embossed | Same as Stock B above but embossed | Same as Stock E above but embossed | Same as Stock F above but embossed | Same as Stock G above but embossed |
| Flex Fatigue, cycles to break, with embossed leather grain. | 9,720 | 16,516 | No break at 38,880. | No break at 83,160. | 12,096 |
| Flex Fatigue, cycles to break same material with no grain (data for unembossed specimens, taken from Table I, included for purposes of comparison). | 16,200 | 29,160 | 133,920 | 137,600 | 38,880 |

Table III illustrates the effect on flex fatigue resistance of compositions having not only an embossed surface but also containing color pigment. The pigment used was "Titanox A" (titanium dioxide). These data are important because they demonstrate the properties of stocks used in fabrication of commercial automotive parts. From the data given in Table III it is evident that the inclusion of color pigment further reduces the flex resistance figures below those obtained with an embossed grain but no color.

TABLE III

[All test specimens were 70 gauge]

| Stock | N | O | P |
|---|---|---|---|
| | Same as Stock A above but with 15 parts of color pigment and embossed | Same as Stock E above but with 15 parts of color pigment and embossed | Same as Stock F above but with 15 parts of color pigment and embossed |
| With color and embossed grain. Flex Fatigue, cycles to break. | 8,424 | 25,482 | 25,050 |
| Flex Fatigue to break, with embossed grain but no color. | 9,720 | No break at 38,880. | No break at 83,160. |
| Flex Fatigue to break, with no embossing and no color. | 16,200 | 133,920 | No break at 137,600. |

EXPERIMENT Q

In this experiment a mill blend of 85 parts of the latex blend of stock B and 15 parts of "Geon 404HI" was prepared and formed into sheets in the same way as before. Embossed and unembossed specimens were tested. The data on the resulting product (stock Q) are given in Table IV; the corresponding data for stocks B and J are included for comparison.

TABLE IV

[Specimens 70 gauge]

| | Stock B | Stock J | Stock Q |
|---|---|---|---|
| Flex Fatigue, cycles to break, with no grain. | 29,160 | | 55,080 |
| Flex Fatigue, cycles to break, with embossed leather grain. | | 16,516 | 13,392 |

It will be seen that stock Q (which contained 60.7% of the styrene-acrylonitrile resin, 25.5% of the high gel Buna N and 13.8% of polyvinyl chloride) when smooth had a considerably improved flex fatigue resistance. When embossed, the material with the added vinyl resin showed a definite drop in fatigue resistance. I believe that this is because the depth of embossing of stock Q was definitely greater than in the case of stock J. It is well known that the surface condition of a specimen subjected to flexing affects its stress resistance very markedly. Thus, steel bars of identical composition, one having a highly polished scratch-free surface and the other having a dull roughened surface, will give vastly different flex fatigue resistance values, the rough bar failing long before the polished bar.

EXPERIMENT R

Stock F was fabricated into an embossed automobile side seat trim panel by conventional sheeting and drawing techniques. This panel was installed in an automobile and tested under actual conditions of service. After prolonged use, it was inspected and found to be in excellent condition.

EXPERIMENTS AA TO EE

The following Masterbatches #1 and #2 were prepared by milling:

*Masterbatch No. 1*

| | Parts |
|---|---|
| Styrene-acrylonitrile resinous copolymer (as in preceding examples) | 70 |
| High tight gel Buna N (as in preceding examples) | 30 |

*Masterbatch No. 2*

| | Parts |
|---|---|
| Polyvinyl chloride ("Marvinol VR-10" [1]) | 92 |
| Styrene-acrylonitrile resinous copolymer (as in preceding examples) | 8 |

[1] Polyvinyl chloride.

The following stocks were then prepared and converted into unembossed sheets which were tested. The data are given in Table V.

TABLE V

| Stock | AA | BB | CC | DD | EE |
|---|---|---|---|---|---|
| Masterbatch #1 | 850 | 850 | 750 | 950 | 850 |
| Masterbatch #2 | 150 | | 250 | 50 | |
| "Vinylite VYNW" [1] | | 150 | | | |
| "Marvinol VR-10" | | | | | 150 |
| Percent Buna N | 25.5 | 25.5 | 22.5 | 28.5 | 25.5 |
| Percent ST-AN Resin | 60.7 | 59.5 | 54.5 | 66.9 | 59.5 |
| Percent Vinyl Resin | 13.8 | 15.0 | 23.0 | 4.6 | 15.0 |
| Flex Fatigue | 62,654 | 103,313 | 42,986 | 26,332 | 59,188 |
| Tensile | 4,760 | 4,250 | 4,820 | 4,120 | 3,940 |
| Elongation, percent | 71 | 130 | 122 | 108 | 126 |

[1] Resinous copolymer of approximately 96% vinyl chloride and 4% vinyl acetate.

| Stock | AA | BB | CC | DD | EE |
|---|---|---|---|---|---|
| Elongation Range | 33–125 | 113–144 | 81–137 | 53–91 | 109–143 |
| R.T. Charpy Impact | 15.0 | 7.4 | 12.2 | 16.1 | 8.9 |
| Rockwell R Hardness | 83 | 80 | 92 | 79 | 83 |
| Heat Distortion Temp., °F | 159 | 167 | 162 | 175 | 164 |

Experiments AA to EE show that the incorporation of a variety of forms of vinyl chloride gives the results of my invention.

From the foregoing description, it will be seen that our invention provides a simple and commercially feasible means of accomplishing the objects set forth above.

Having thus described my invention, what I claim and desire to protect by Letters Patent is:

1. As a new composition of matter, a hard, tough, thermoplastic mixture of (A) a rubbery copolymer consisting of 55 to 85% of butadiene and correspondingly 45 to 15% acrylonitrile, (B) a resinous copolymer consisting of 50 to 85% of a styrene selected from the group consisting of styrene, alpha-methyl styrene, para-methyl styrene, alpha-methyl para-methyl styrene and nuclearly chlorinated styrenes, and correspondingly 50 to 15% of acrylonitrile, and (C) a thermoplastic resin selected from the group consisting of polyvinyl chloride and copolymers of 85 to 96% of vinyl chloride and correspondingly 15 to 4% of a copolymerizable monomer selected from the group consisting of vinyl acetate, vinylidine chloride and diethyl maleate, in relative proportions of from 10 to 40% of (A), from 50 to 88% of (B), and from 2 to 30% of (C); said percentages being by weight based on the sum of (A), (B) and (C) and totalling 100%, said mixture being essentially free from liquid plasticizer.

2. A composition of matter as recited in claim 1 in sheet-like continuous form and having an embossed surface.

3. A composition of matter as recited in claim 1 in sheet-like continuous form, containing at least 10 parts by weight of pigment per 100 parts of (A), (B) and (C), and having an embossed surface.

4. As a new composition of matter, a hard, tough, thermoplastic mixture of (A) a rubbery copolymer consisting of 55 to 85% of butadiene and correspondingly 45 to 15% acrylonitrile, (B) a resinous copolymer consisting of 70 to 80% of styrene and correspondingly 30 to 20% of acrylonitrile, and (C) a thermoplastic resin selected from the group consisting of polyvinyl chloride and copolymers of 85 to 96% of vinyl chloride and 15 to 4% of a copolymerizable monomer selected from the group consisting of vinyl acetate, vinylidine chloride and diethyl maleate, in relative proportions of from 10 to 40% of (A), from 50 to 88% of (B), and from 2 to 30% of (C), said percentages being by weight based on the sum of (A), (B) and (C) and totalling 100%, said mixture being essentially free from liquid plasticizer.

5. A composition of matter as recited in claim 4 in sheet-like continuous form and having an embossed surface.

6. A composition of matter as recited in claim 4 in sheet-like continuous form, containing at least 10 parts by weight of pigment per 100 quarts of (A), (B) and (C), and having an embossed surface.

References Cited in the file of this patent

UNITED STATES PATENTS

| | | |
|---|---|---|
| 2,439,202 | Daly | Apr. 6, 1948 |
| 2,652,384 | Sayko et al. | Sept. 15, 1953 |
| 2,802,809 | Hayes | Aug. 13, 1957 |
| 2,807,603 | Parks et al. | Sept. 24, 1957 |
| 2,825,661 | Dosmann | Mar. 4, 1958 |

OTHER REFERENCES

Kenney: "Integrating Plastic and Rubber Industries," Modern Plastics, September 1946, page 106.

"Rubber-Resin Blends," Rubber Age, volume 74, No. 4, January 1954, pages 552 to 553.